(12) United States Patent
Jeong et al.

(10) Patent No.: US 9,303,845 B2
(45) Date of Patent: Apr. 5, 2016

(54) DISPLAY APPARATUS

(71) Applicant: LG ELECTRONICS INC., Seoul (KR)

(72) Inventors: Chansung Jeong, Seoul (KR); Sangtae Park, Seoul (KR); Hoon Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 13/928,767

(22) Filed: Jun. 27, 2013

(65) Prior Publication Data

US 2014/0301065 A1    Oct. 9, 2014

(30) Foreign Application Priority Data

Apr. 4, 2013    (KR) .......................... 10-2013-0036885

(51) Int. Cl.
*G09F 13/04* (2006.01)
*G09F 13/08* (2006.01)
*F21V 13/12* (2006.01)
*F21V 13/04* (2006.01)
*G02B 19/00* (2006.01)
*G02F 1/1335* (2006.01)

(52) U.S. Cl.
CPC ................. *F21V 13/12* (2013.01); *F21V 13/04* (2013.01); *G02B 19/0028* (2013.01); *G02B 19/0066* (2013.01); *G02F 1/133606* (2013.01); *G02F 1/133603* (2013.01); *G02F 2001/133607* (2013.01)

(58) Field of Classification Search
CPC ...... F21V 13/04; F21V 13/12; G02B 19/0028; G02B 19/0066; G02F 1/133603; G02F 2001/133607; G02F 1/133606
USPC ...................... 362/97.1–97.3, 296.01, 311.02, 362/600–634
See application file for complete search history.

(56) References Cited

U.S. PATENT DOCUMENTS

2011/0310615 A1    12/2011    Kato et al. ............... 362/296.01

FOREIGN PATENT DOCUMENTS

EP            1 860 467 A1    11/2007
JP            2012-204336 A   10/2012

OTHER PUBLICATIONS

European Search Report dated Sep. 11, 2014 issued in Application No. 13003898.7 (with English translation).

*Primary Examiner* — Anh Mai
*Assistant Examiner* — Jessica M Apenteng
(74) *Attorney, Agent, or Firm* — Ked & Associates, LLP (57) ABSTRACT

A display apparatus is provided. The display apparatus may include a substrate, a light emitting device, a reflective layer, an optical sheet, and a display panel. The light emitting device may include a light emitting element mounted on the substrate and a lens disposed over the light emitting element. The reflective layer may be disposed over an upper surface of the substrate. The optical sheet may be disposed over the reflective layer, spaced apart from the light emitting device. The display panel may be disposed over an upper surface of the optical sheet. The lens may include a rounded convex upper surface having an aspherical shape, and a lower surface central part recessed upward from an undersurface of the lens.

16 Claims, 6 Drawing Sheets

DISPLAY APPARATUS

CROSS-REFERENCE TO RELATED APPLICATION(S)

This application claims priority under 35 U.S.C. §119 to Korean Application No. 10-2013-0036885 filed on Apr. 4, 2013, whose entire disclosure is hereby incorporated by reference.

BACKGROUND

1. Field

This relates to a display apparatus.

2. Background

Various types of display apparatuses, such as Liquid Crystal Display Devices (LCD), Plasma Display Panels (PDP), Electro Luminescent Displays (ELD), and Vacuum Fluorescent Displays (VFD) are widely used. Liquid crystal panels of an LCD include a liquid crystal layer and a TFT substrate and a color filter substrate that are opposite to each other across the liquid crystal layer, and use light provided from a backlight unit to display an image to compensate for the lack of self-light-emission.

BRIEF DESCRIPTION OF THE DRAWINGS

The embodiments will be described in detail with reference to the following drawings in which like reference numerals refer to like elements wherein.

DETAILED DESCRIPTION

In the following detailed description of the preferred embodiments, reference is made to the accompanying drawings that form a part hereof, and in which is shown by way of illustration specific embodiments. These embodiments are described in sufficient detail to enable those skilled in the art, and it is understood that other embodiments may be utilized and that logical structural, mechanical, electrical, and chemical changes may be made without departing from the spirit or scope as broadly described herein. To avoid detail not necessary to enable those skilled in the art, the description may omit certain information known to those skilled in the art. The following detailed description is, therefore, not to be taken in a limiting sense.

A display apparatus according to an embodiment as broadly described herein may include a substrate unit, a light emitting unit including a light emitting element mounted in the substrate unit and a lens disposed over the light emitting element, a reflective layer disposed over an upper surface of the substrate unit, an optical sheet disposed over the reflective layer and disposed at a height spaced from the light emitting unit; and a display panel disposed over an upper surface of the optical sheet, wherein the lens may include an upper surface part convexly rounded in a form of aspherical surface, and a lower surface central part upwardly recessed from an undersurface of the lens and having a shape in which a pair of prisms or laid triangular pillars cross each other.

The upper surface part may have an isotropic structure in which a surface of the lens is convexly curved at a certain curvature from a central part of the lens to an edge of the lens.

The upper surface central part of the lens may be recessed to a certain depth, and an upper end of the lower surface central part and a lower end of the upper surface central part may be spaced from each other by a certain distance.

The upper surface part may include a first curved surface part in which at least a portion of light refracted at a surface of the lower surface central part is totally reflected; and a second curved surface part defining an edge region of the lens at an end portion of the first curved surface part.

The recessed parts having a prism or laid triangular pillar shape may have a first inclination surface and a second inclination surface, upper end portions of which meet each other at a point upwardly spaced from a bottom surface, respectively.

The recessed parts having the pair of prisms or laid triangular pillars shape may cross each other, and upper end portions of the pair of recessed parts may cross each other at a central point of the lens.

The lens may have a luminous intensity distribution (S/P) ranging from about 0.3 to about 0.5. Here, S is a vertical length from an upper surface central part of the lens to an upper end of the lens, and P is a horizontal length from a center of the lens to a point where a gradient of the upper surface part of the lens becomes zero.

The upper surface part of the lens may be rounded at a certain curvature such that an incidence angle of light becomes equal to or greater than about 42 degrees.

The reflective layer may have at least a portion inclined upwardly.

The optical sheet may include a plurality of light shielding patterns formed therein, and the light shielding pattern may include one of a protrusion-typed pattern, a dotted pattern printed in dark color, and a hold pattern.

The reflective layer may include a plurality of reflective patterns formed therein, and the reflective pattern may include a transparent protrusion-typed pattern.

The display apparatus may include a light guide layer that is a gap between the reflective layer and the optical sheet. Here, the light guide layer includes one of an air layer or a vacuum layer.

A backlight unit of an LCD may make use of an isotropic lens having a structure in which light sources are arranged in an orthogonal or honeycomb structure such that the lens disperses light emitted from the light sources in a form of isotropic light distribution. In such a structure, since the pitch between the light sources increases as the number of light sources is reduced, it may be difficult to disperse light in the form of circular isotropic light distribution using a secondary lens. Further, if the thickness of a light guide layer of such an arrangement were reduced to reduce overall thickness of the backlight unit after a plurality of light sources are disposed under the backlight unit, the luminous intensity uniformity may be reduced due to occurrence of a hot spot.

Figure 1:
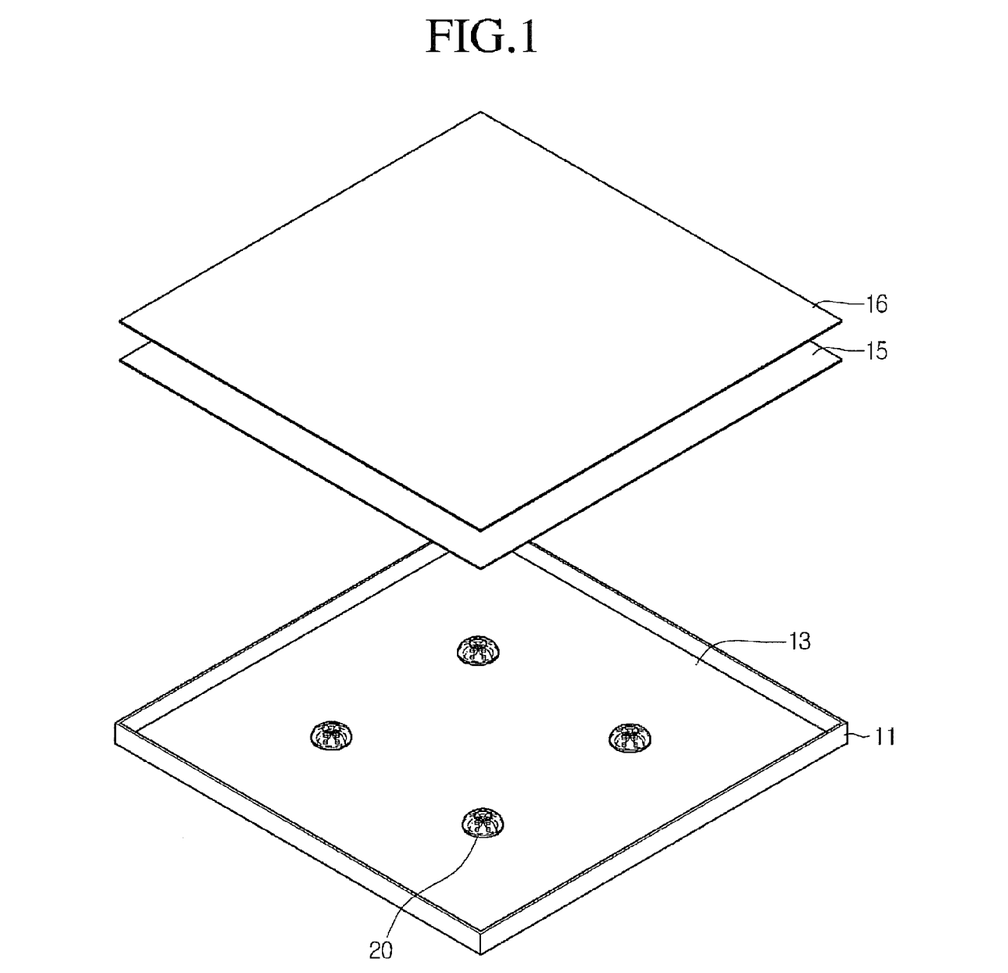
FIG. 1 is an exploded perspective view illustrating a display apparatus according to an embodiment.
Figure 2:
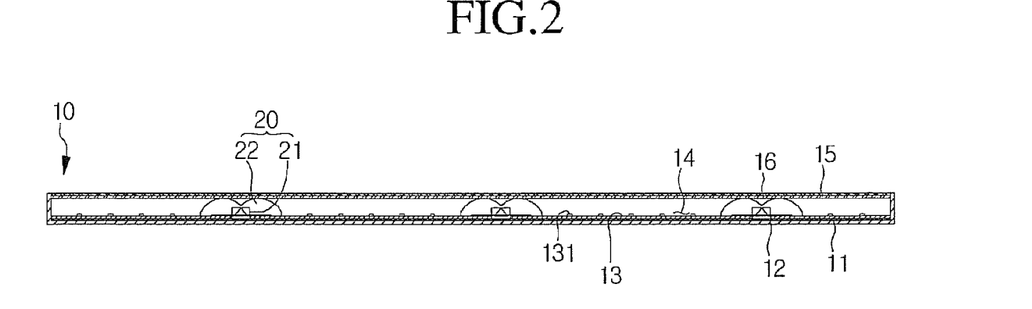
FIG. 2 is a longitudinally-sectional view illustrating a display apparatus according to an embodiment.

FIG. 1 is an exploded perspective view of a display apparatus according to an embodiment as broadly described herein, and FIG. 2 is a longitudinal sectional view of a display apparatus according to an embodiment as broadly described herein.

Referring to FIGS. 1 and 2, a display apparatus 10 may include a display panel 16 on which an image is displayed, a backlight unit, or backlight device, that is disposed at a rear of the display panel 16 to emit light to the display panel 16, and an optical sheet 15 that diffuses or processes light emitted from the backlight unit.

The optical sheet 15 may include a diffusion sheet and a prism sheet. The backlight unit may include a Light Emitting Diode (LED) as a light source, and may be, for example, a top view type in which the traveling direction of light emitted from the light source faces the display panel 16.

The backlight unit may include a substrate layer 12 disposed on the bottom of a panel case 11, a light emitting unit 20 mounted on the substrate layer 12, and a reflective layer 13 disposed on the upper surface of the substrate layer 12.

More specifically, the light emitting unit 20 may be arranged in plurality at a certain interval on a central portion of the reflective layer 13. The reflective layer 13 may have a flat plate form, and alternatively, may be disposed such that the edge portion of the reflective layer 13 is inclined upward at a certain angle. For example, the edge portion of the reflective layer 13 may be upwardly inclined to the end portion at a point outwardly spaced by a certain distance from the light emitting unit 20. Then, the longitudinal section of the reflective layer 13 may have a "U" shape in which the bottom surface thereof is flat and side surfaces thereof spread outward toward the upper end. Since a portion of the reflective layer 13 is inclined, light emitted from the light emitting unit 20 and refracted to the reflective layer 13 may be reflected to the optical sheet 15, thereby increasing the surface luminous efficiency. A reflective pattern or a light extraction pattern 131 may be formed on the upper surface of the reflective layer 13 to allow light emitted from the light emitting unit 20 to be reflected by the pattern toward the display panel 16. The reflection pattern or the light extraction pattern 131 may be provided in the form of protrusion as shown in FIG. 2. The reflection pattern or the light extraction pattern 131 may include a transparent protrusion-type pattern.

The substrate 12 may include a PCB substrate formed using polyethylene terephthalate, glass, polycarbonate, and silicon, and may be provided in the form of a film.

Each light emitting unit 20 may include a light emitting element 21 including an LED, and a lens 22 disposed over the light emitting element 21. The light emitting element 21 may be a top view type LED package in which the light emitting surface faces the upper side, and may upwardly emit light having a beam angle of about 120 degrees. Most of the light emitted by the light element 21 may be totally reflected in a lateral direction. More specifically, about 37% light emitted from the light emitting element 21 may travel to the optical sheet 15, and about 57% light may be reflected and refracted by the lens 22 to travel in the lateral direction. Accordingly, the thickness of the backlight unit may be reduced and the surface luminous efficiency and the luminance uniformity may be improved, by providing the lens 22 over the light emitting element 21.

A light guide layer 14 may be disposed between the reflective layer 13 and the optical sheet 15, and the light guide layer 14 may be filled with air or may be maintained in a vacuum state.

Figure 3:
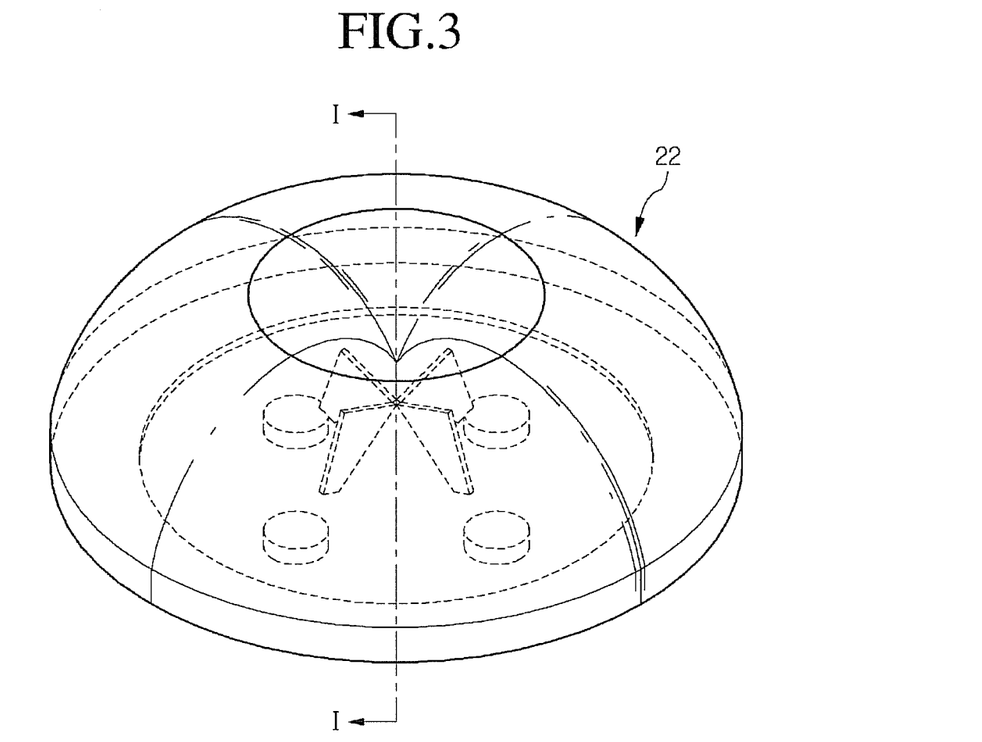
FIG. 3 is a perspective view illustrating a lens according to an embodiment.
Figure 4:
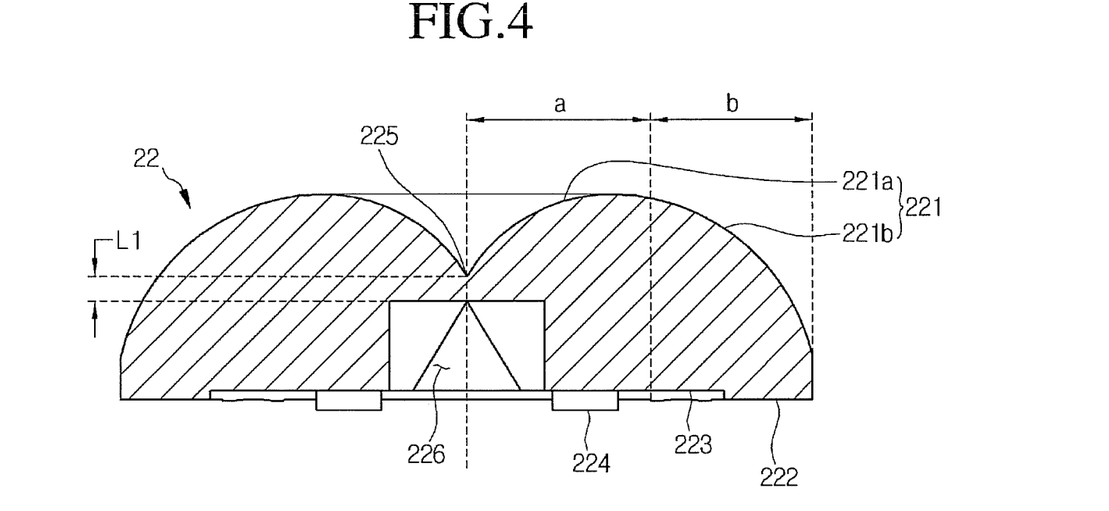
FIG. 4 is a longitudinal sectional view taken along line I-I of the lens of FIG. 3 according to an embodiment.
Figure 5:
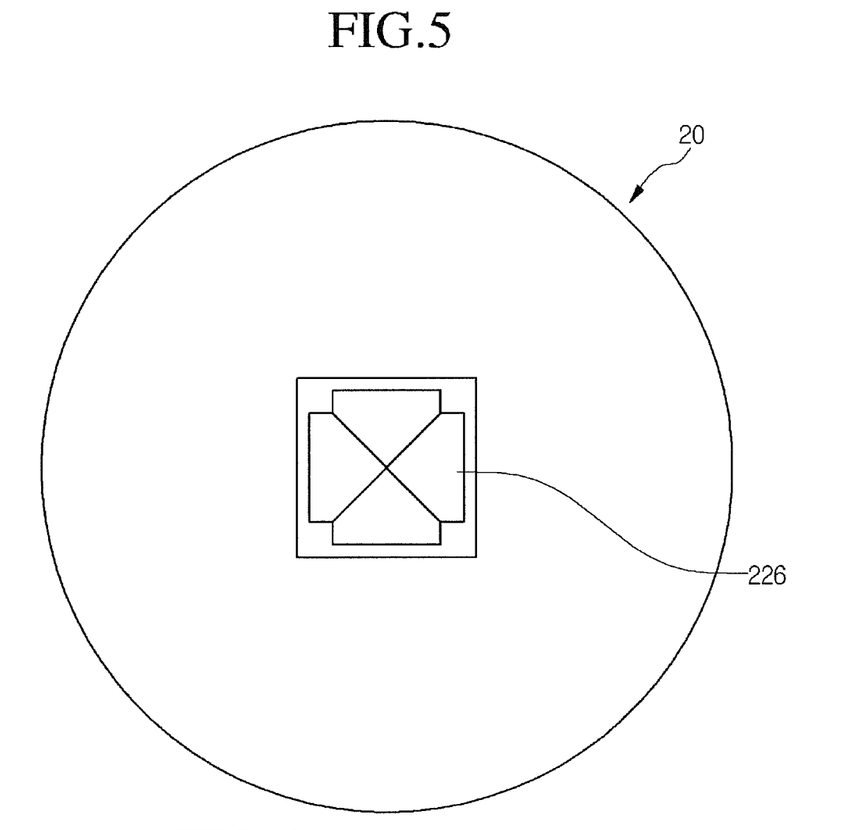
FIG. 5 is a view illustrating an undersurface of a lens according to an embodiment.
Figure 6:
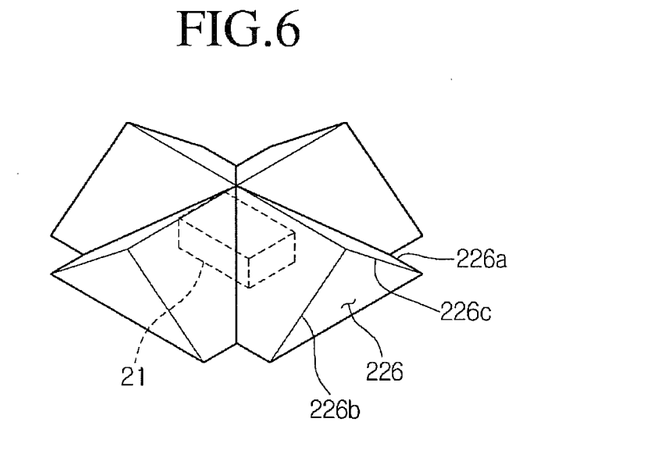
FIG. 6 is a perspective view illustrating a shape of a central part of a lens according to an embodiment.

FIG. 3 is a perspective view of a lens according to an embodiment as broadly described herein, FIG. 4 is a longitudinal sectional view taken along line I-I of the lens shown in FIG. 3, FIG. 5 is a bottom view of the lens, and FIG. 6 is a perspective view of a shape of a central part of a lens according to an embodiment as broadly described herein.

Referring to FIGS. 3 through 6, a light emitting unit 20 according to an embodiment as broadly described herein may include a light emitting element 21 and a lens 22 provided over the light emitting element 21. As described above, the light emitting element 21 may include an LED package, and the LED package may include a sub-mount substrate and an LED element mounted in the sub-mount substrate. The sub-mount substrate may be formed of a transparent polymer material including glass, transparent ceramic, or resin.

Specifically, in order to guide light in the lateral direction by inducing the total reflection of light emitted from the light emitting element 21, the light emitting surface of the lens 22 may be a rounded convex aspherical surface. The lens 22 may be manufactured by an injection molding process using a transparent polymer resin.

More specifically, the lens 22 may include a lower surface part 222 facing the substrate layer (or reflective layer) 12, an upper surface part 221 convexly rounded from the lower surface part 222, and a lower surface central part 226 upwardly recessed from the center of the lower surface part 222. The lens 22 may have an upper surface central part 225 downwardly recessed to a certain depth. The recess of the central part 225 may be caused by the shape of the lens 22 in which the upper surface part 221 is convexly rounded outwardly from the central point of the lens 22.

A stepped surface 223 may be upwardly formed to a certain depth from a point spaced from the edge of the lower surface part 222 by a certain distance in the central direction to the central point of the lower surface part 222. A plurality of supporting protrusions 224 may protrude downward from the stepped surface 223. However, the lens 22 according to the embodiment is not limited thereto. For example, the lower surface part 222 may have a flat surface, without a stepped surface. In this case, the supporting protrusion 224 may protrude from the lower surface part 222.

The lower surface central part 226 may have a certain shape and depth within an area bounded by the plurality of the supporting protrusions 224, i.e., the central region of the lens 22. The light emitting element 21 may be disposed directly under the lower surface central part 226. Light emitted upward from the light emitting element 21 may be dispersed in a plurality of directions inside the lower surface central part 226, and may be refracted by the surface of the lower surface central part 226. The refracted light may partially transmit the upper surface of the lens 22, and may be partially totally-reflected, being diffused in a form of isotropic light distribution when viewed from the upper surface of the backlight unit.

The upper surface part 221 of the lens 22 may be divided into a first section 'a' from the upper surface central part 225 of the lens 22 to a peak where the gradient becomes 0, and a second section 'b' from the edge of the first section a to a point where the gradient becomes 1. The first section a of the upper surface part 221 may be defined as a first curved surface part 221a, and the second section b of the upper surface part 221 may be defined as a second curved surfaced part 221b. Light hitting the first curved surface part 221a may be totally reflected to the lower surface part 222 of the lens 22, and light totally-reflected by the reflective layer 13 may be reflected to the second curved surface part 221b. Light hitting the second curved surface part 221b may be partially transmitted to be irradiated to the optical sheet 15, and other light may be refracted in a lateral direction of the lens 22, or may be re-reflected to the lower surface part 222. Thus, since most light emitted from the light emitting element 21 is refracted or re-reflected to be diffused in a lateral direction of the lens 22, light may be dispersed relatively far, and uniformity of the luminance of the backlight unit may be increased. On the other hand, light passing the second curved surface part 221b may form a hot spot on the optical sheet 15. However, the hot spot may be reduced/eliminated by the diffusion pattern formed on the optical sheet 15. The diffusion pattern formed on the optical sheet 15 may include a transparent protrusion type of diffusion pattern that reflects a portion of light, and a diffusion pattern that is dotted in dark color or a hole pattern formed by a plurality of holes having various sizes. These diffusion patterns may allow light hitting the protrusion or dot, other than the pattern hole point, to be reflected, and may allow light hitting other regions to transmit the optical sheet 15 to be moved to the display panel 16. Thus, the hot spot formed when light is concentrated on a point of the optical sheet 15 may be reduced, and the luminance may be uniformly controlled.

The internal space of the lower surface central part 226 may form a shape in which prisms or laid triangular pillars cross each other. More specifically, the lower surface central part 226 may have a recessed space in which a pair of prisms or laid triangular pillars cross each other. Here, the amount of light that is reflected or refracted in a lateral direction of the lens 22, the magnitude of luminance, and/or luminance may be controlled based on the width and/or height of the prisms or laid triangular pillars. Also, the transmittance of light emitted from the light emitting element 21 may be controlled by adjusting the surface roughness of the portion of the lens defining the outline of the lower surface central part 226. The upper surface of the lower surface central part 226 and the upper surface central part 225 of the lens 22 may be spaced from each other by a certain length L1. That is, the upper surface central part 225 may be spaced from the upper end of the lower surface central part 226 such that the lower surface central part 226 does not communicate with the light guide layer 14 in which the lens 22 is disposed. If the light guide layer 14 were to communicate with the lower surface central part 226, light may be irradiated on the optical sheet 15 through the communicating passage, forming a hot spot having an excessively high luminance on the optical sheet 15.

Regarding the space defined by the pair of prisms or laid triangular pillars that form the lower surface central part 226, a bottom surface 226a may be on the same plane as the lower surface part 222 or the stepped surface 223 of the lens. Also, a first inclination surface 226b and a second inclination surface 226c extending from the bottom surface 226a may be opposite to each other. That is, the first inclination surface 226b and the second inclination surface 226c may obliquely meet each other at the upper end thereof. A pair of prisms or laid triangular pillars may cross each other to form the space of the lower surface part 226. The upper end portions of the pair of prisms or laid triangular pillars may meet each other at one point on the central part of the lens 22, and the upper surface central part 225 of the lens 22 may be located directly over the point. The light emitting element 21 may be disposed at the center of the lower surface central part 226.

In such a structure, light emitted from the light emitting element 21 may be upwardly irradiated to be refracted by the first inclination surface 226b and the second inclination surface 226c. The refracted light may hit the upper surface part 221 to be totally-reflected or refracted.

Figure 7:
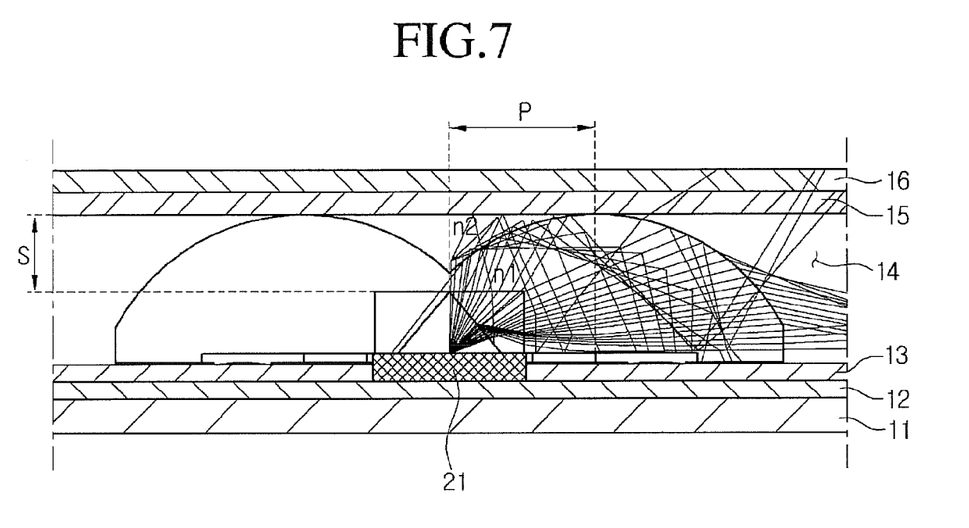
FIG. 7 is a longitudinal sectional view of a backlight unit, showing the reflection or refraction of light through a lens according to an embodiment.

FIG. 7 is a longitudinal sectional view of a backlight unit, showing the reflection or refraction of light through a lens, according to an embodiment as broadly described herein.

Referring to FIG. 7, light emitted from the light emitting element 21 may be primarily refracted by the lower surface central part 226 of the lens 22, and then the refracted light may be totally-reflected and refracted by the upper surface part 221 of the lens 22.

A portion of the light refracted by the lower surface central part 226 may be totally-reflected by the first curved surface part 221a of the upper surface part 221, and other portions of the light may be totally-refracted or refracted by the second curved surface part 221b of the upper surface part 221. Light totally-reflected by the first curved surface part 221a may be re-reflected by the reflective layer 13 of the backlight unit to be irradiated on the second curved surface part 221b. Also, a portion of light irradiated on the second curved surface part 221b may be transmitted, refracted, or totally reflected again.

The upper surface part 221 of the lens 22 may totally reflect light upwardly emitted from the light emitting element 21 in a lateral direction. The total reflection angle θc may be expressed as the following Equation (1) by Snell's law.

$$\sin \theta c = (n2/n1) \qquad \text{Equation (1)}$$

In Equation (1), n1 is the refractive index of the lens, and n2 is the refractive index of air.

When the lens 22 is formed of polycarbonate having a refractive index of about 1.58, a critical angle θc of about 42 degrees may be appropriate for the total reflection. Accordingly, the curvature of the upper surface part 221 may be configured such that the incidence angle of light incident on the upper surface part 221 is greater than or equal to about 42 degrees. Then, most light incident on the upper surface part 221 of the lens 22 may be totally reflected to be diffused into the light guide layer 14, and only a portion of light may transmit toward the optical sheet 15. Here, a light shielding pattern layer may be disposed over the upper surface of the lens 22 such that a portion of light traveling to the display panel 15 may be re-reflected to the light guide layer 14.

The dispersion degree of light incident into the lens 22 from the light emitting element 21 may be determined by dividing the depth S of the central part 225 of the lens 22 by the pitch P of the upper surface part 221 of the lens 22. The pitch of the upper surface part 221 of the lens 22 denotes a distance from the upper surface central part 225 of the lens 22 to a point where the gradient of the upper surface part 221 of the lens 22 becomes zero, i.e., the length of the first region a. Hereinafter, the S/P value that denotes the dispersion degree of light incident into the lens 22 will be defined as the luminous intensity distribution of the lens. When the value of the luminous intensity distribution is larger, the total reflection of light may increase, allowing light to be uniformly dispersed relatively far.

In the test results, when the luminous intensity distribution is larger, the luminance of the central part of a hot spot decreases to improve the surface luminous efficiency. Also, since the optical loss significantly increases when the luminous intensity distribution is smaller than about 0.3, it is desirable that the luminous intensity distribution be greater than or equal to about 0.3, more preferably, about 0.5.

Figure 8:
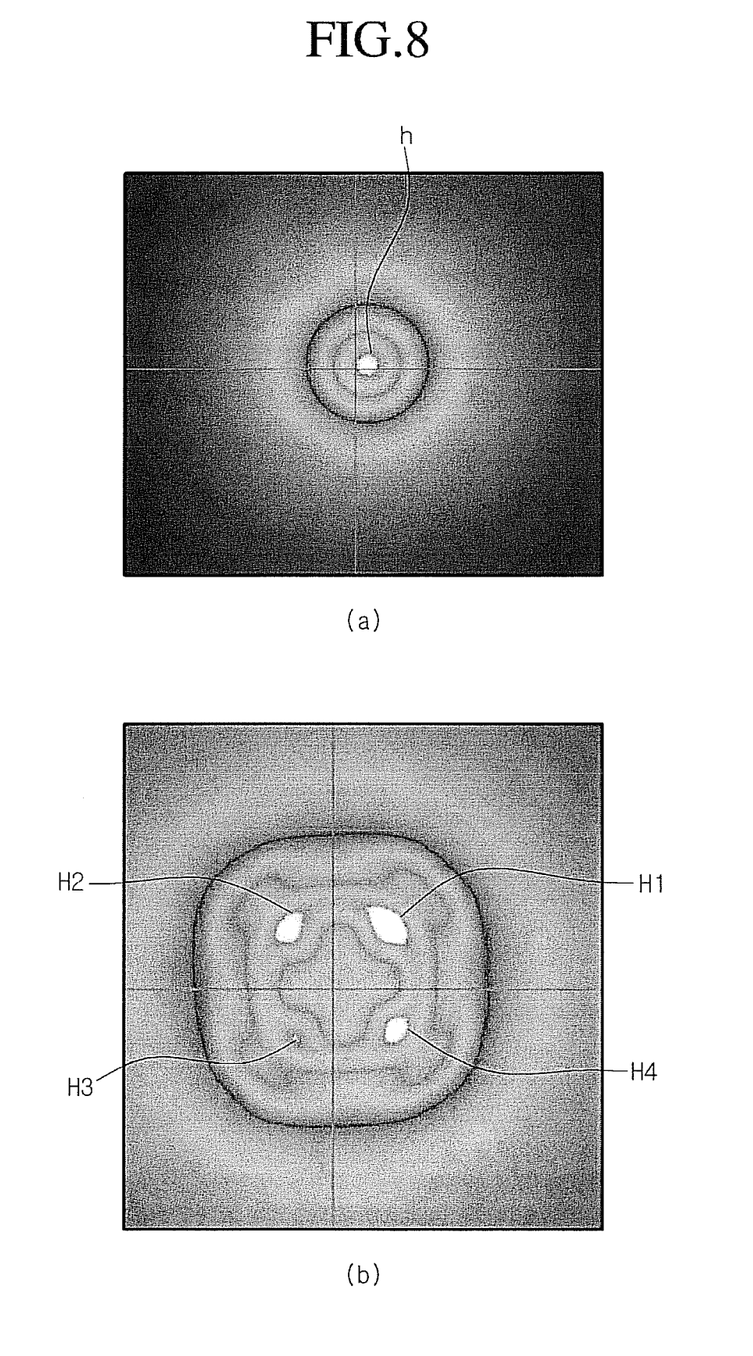
FIGS. 8A and 8B illustrate a comparison between light distribution by a light emitting unit having a lens according to an embodiment and light distribution without such a lens.
Figure 9:
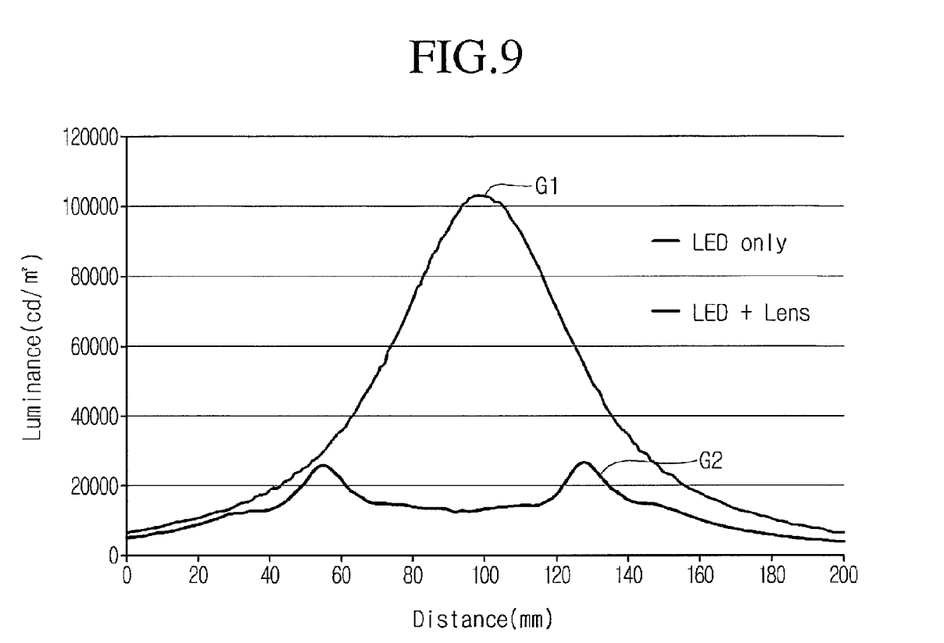
FIG. 9 is a graph illustrating a comparison between the intensity of a hot spot at a light emitting unit having a lens according to an embodiment and the intensity of a hot spot at a light emitting unit without such a lens.

FIGS. 8A and 8B illustrate a comparison between the light distribution from a light emitting unit having a lens according to an embodiment as broadly described herein and the light distribution of a light emitting unit without such a lens. FIG. 9 is a graph comparing the intensity of a hot spot generated by a light emitting unit having a lens according to an embodiment as broadly described herein and the intensity of a hot spot generated by a light emitting unit without such a lens.

As shown in FIG. 8A, in a light emitting unit without a lens as embodied and broadly described herein, a hot spot point 'h' is formed at the central part of a light emitting element. In contrast, as shown in FIG. 8B, in the light emitting unit 20 as embodied and broadly described herein, a plurality of hot spot points H1 to H4 are formed at points outwardly spaced from the central part of the light emitting element 21.

As shown in FIG. 9, the luminance of light measured at the hot spot points H1 to H4 formed by the light emitting unit shown in FIG. 8B decreases by about 75% compared to the luminance measured at the hot spot point h formed by the light emitting unit shown in FIG. 8A.

From these test results, it can be seen that when the lens 22 according to the embodiment is applied, the number of hot spots increases but the luminance measured at the center of the hot spot significantly decreases.

Since the luminance of the hot spot h generated by the arrangement shown in FIG. 8A is excessively high, it is difficult to achieve uniform luminance, resulting in a limitation in the ability to reduce the thickness of the light guide layer 14. On the other hand, as shown in FIG. 8B, when the light emitting unit with the lens as embodied and broadly described herein is mounted in the backlight unit, the number of hot spots increases but the luminance of the central part of the hot spot significantly decreases. Accordingly, uniform luminance may be achieved, and the thickness of the light guide layer 14 may be reduced by half.

According to embodiments, thickness of a backlight unit may be reduced, and an exterior of a display apparatus including such a backlight may be improved.

Also, the display apparatus may totally reflect light emitted from a light emitting element in a downward direction of a lateral surface by disposing a lens structure according to an embodiment over an LED element and may minimize the reduction of luminous intensity uniformity by allowing hot spots to be dispersed into a plurality of points. That is, compared to a backlight unit in which a single hot spot with significantly high luminance is formed from one light source, the backlight unit using the lens according to the embodiment may secure a surface light source with uniform luminance because a plurality of hot spots with low luminance are dispersed.

Also, since fluctuation in luminance due to the hot spot may be minimized, the thickness of the backlight unit may be reduced by half. Accordingly, the total thickness of the display apparatus may be reduced, enabling the production of a slimmer display apparatus.

Furthermore, since most light emitted from the light source is totally reflected and dispersed in the lateral direction while passing through the lower surface central part of the lens according to the embodiment, light may be dispersed further.

In addition, since light may be dispersed further, the number of necessary light sources may be reduced, and thus the manufacturing cost of the display apparatus may also be reduced.

A backlight unit with a lens is provided which may minimize fluctuations or irregularity in luminance because a hot spot may be dispersed to various points despite a reduction in thickness of a backlight unit.

In one embodiment, a display apparatus may include a substrate unit, a light emitting unit including a light emitting element mounted in the substrate unit and a lens disposed over the light emitting element, a reflective layer disposed over an upper surface of the substrate unit, an optical sheet disposed over the reflective layer and disposed at a height spaced from the light emitting unit, and a display panel disposed over an upper surface of the optical sheet, wherein the lens may include an upper surface part convexly rounded in a form of a spherical surface, and a lower surface central part upwardly recessed from an undersurface of the lens and having a shape in which a pair of prisms or laid triangular pillars cross each other.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
a substrate;
a light emitting device, comprising a light emitting element mounted on the substrate and a lens disposed over the light emitting element;
a reflective layer disposed over an upper surface of the substrate;
an optical sheet disposed over the reflective layer and spaced apart from the light emitting device; and
a display panel disposed over an upper surface of the optical sheet, wherein the lens comprises:
an upper surface part having an aspherical convexly rounded contour; and
a lower surface central part formed as a recess that extends upward from an undersurface of the lens,
wherein the recess has a shape of a pair of overlapping prisms or a pair of crossing triangular pillars,
wherein the recess forming the lower surface central part includes a first inclined surface and a second inclined surface, the first and second inclined surface having upper end portions which meet at a point spaced upward from a bottom surface of the lower surface central part.

2. The display apparatus of claim 1, wherein the upper surface part of the lens has an isotropic structure in which a surface of the lens is convexly curved at a certain curvature from an upper surface central part of the lens to an edge of the lens.

3. The display apparatus of claim 2, wherein the upper surface central part of the lens is recessed to a certain depth, and an upper end of the lower surface central part and a lower end of the upper surface central part of the lens are spaced from each other by a certain distance.

4. The display apparatus of claim 3, wherein the upper surface part of the lens comprises:
a first curved surface in which at least a portion of light refracted at a surface of the lower surface central part is totally reflected; and
a second curved surface extending from an end of the first curved surface to define a corresponding edge region of the lens.

5. The display apparatus of claim 1, wherein the pair of prisms or pair of triangular pillars forming the recess that forms the lower surface central part overlap or cross each other at respective upper end portions thereof corresponding to a central point of the lens.

6. The display apparatus of claim 1, wherein the pair of prisms or pair of triangular pillars forming the recess that forms the lower surface central part overlap or cross each other at respective upper end portions thereof corresponding to a central point of the lens.

7. The display apparatus of claim 1, wherein the lens has a luminous intensity distribution (S/P) ranging from about 0.3 to about 0.5, wherein S is a vertical distance from an uppermost surface t of the lower surface central part of the lens to an uppermost portion of the upper surface part of the lens, and P is a horizontal distance from a center of the lens to a point where a gradient of the upper surface part of the lens becomes zero.

8. The display apparatus of claim 1, wherein the upper surface part of the lens is rounded at a certain curvature such that an incidence angle of light incident thereof is greater than or equal to about 42 degrees.

9. The display apparatus of claim 1, wherein an edge portion of the reflective layer extends upward at an incline toward the optical sheet.

10. The display apparatus of claim 1, wherein the optical sheet comprises a plurality of light shielding patterns formed therein, the plurality of light shielding patterns comprising at least one of a protrusion-type pattern, a dark dotted pattern, or a hold pattern.

11. The display apparatus of claim 1, wherein the reflective layer comprises a plurality of reflective patterns formed therein, comprising a transparent protrusion-type pattern.

12. The display apparatus of claim 1, further comprising a light guide layer that forms a gap between the reflective layer and the optical sheet, the light guide layer comprising one of an air layer or a vacuum layer.

13. A display apparatus, comprising:
a light emitting device, comprising a light emitting element mounted on a substrate and a lens disposed over the light emitting element; and
a reflective layer, an optical sheet and a display panel sequentially disposed over the substrate, wherein the lens comprises:
an upper surface having an aspherical convexly rounded contour; and
a lower surface having a recess formed at a central portion thereof that extends upward from the lower surface of the lens of the lens, a shape of the recess corresponding to a pair of overlapping prisms or a pair of crossing triangular pillars,
wherein the recess forming the lower surface central part includes a first inclined surface and a second inclined surface, the first and second inclined surface having upper end portions which meet at a point spaced upward from a bottom surface of the lower surface central part.

14. The display apparatus of claim 13, wherein the upper surface of the lens comprises:
an upper central portion that is recessed to a predetermined depth;
a first curved surface extending from the upper central portion, wherein at least a portion of light refracted at the lower surface of the lens is completely reflected by the first curved surface; and
a second curved surface extending from an end of the first curved surface and defining a corresponding edge portion of the lens.

15. The display apparatus of claim 14, wherein a lower end of the recess forming the upper central portion of the upper surface of the lens, and an upper end of the recess formed in the lower surface of the lens, are spaced apart a predetermined distance.

16. The display apparatus of claim 14, wherein the lens has a luminous intensity distribution (S/P) ranging from about 0.3 to about 0.5, where
S is a vertical distance from an uppermost surface t of the recess formed at the central portion of the lower surface of the lens to a point on the upper surface of the lens at which a gradient of the upper surface of the lens is zero, and
P is a horizontal distance from a center of the lens to the point at which the gradient of the upper surface of the lens is zero.

* * * * *